(12) United States Patent
Acree

(10) Patent No.: US 7,258,140 B2
(45) Date of Patent: Aug. 21, 2007

(54) PORTABLE PRESSURIZED GAS SUPPLY APPARATUS FOR PNEUMATIC EQUIPMENT

(76) Inventor: Richard Acree, 8444 Birchcroft, Dallas, TX (US) 75243

( * ) Notice: Subject to any disclaimer, the term of this patent is extended or adjusted under 35 U.S.C. 154(b) by 0 days.

(21) Appl. No.: 10/609,251

(22) Filed: Jun. 27, 2003

(65) Prior Publication Data

US 2004/0074548 A1 Apr. 22, 2004

Related U.S. Application Data

(60) Provisional application No. 60/419,010, filed on Oct. 16, 2002.

(51) Int. Cl.
*B60P 3/22* (2006.01)

(52) U.S. Cl. .................... 137/899.4; 137/210; 137/266; 137/340; 137/557

(58) Field of Classification Search .............. 137/899.4, 137/210, 266, 340, 557; 169/30, 46, 71
See application file for complete search history.

(56) References Cited

U.S. PATENT DOCUMENTS

| | | | |
|---|---|---|---|
| 1,415,047 A | * | 5/1922 | Parsons .................... 137/899.4 |
| 1,644,338 A | | 10/1927 | Jones |
| 2,492,165 A | * | 12/1949 | Daniel ......................... 137/255 |
| 3,318,307 A | | 5/1967 | Nicastro |
| 3,335,766 A | | 8/1967 | Winger |
| 3,578,753 A | | 5/1971 | Freeman |
| 3,727,651 A | | 4/1973 | Biever |
| 3,886,733 A | | 6/1975 | Connell |
| 4,149,388 A | | 4/1979 | Schneider et al. |
| 4,299,091 A | | 11/1981 | Carter et al. |
| 4,838,034 A | | 6/1989 | Leonard et al. |
| 4,899,826 A | | 2/1990 | Penn |
| 4,967,934 A | * | 11/1990 | Andonian ....................... 222/3 |
| 5,431,422 A | | 7/1995 | Gamache |
| 5,489,183 A | | 2/1996 | Malden et al. |
| 5,558,139 A | | 9/1996 | Snyder |
| 5,628,489 A | * | 5/1997 | Woodman ..................... 251/29 |
| 6,173,790 B1 | * | 1/2001 | Russwurm et al. ........... 169/44 |

OTHER PUBLICATIONS

Campbell Hausfeld; Air to Go (Advertisement); 2003; 1 pg.

* cited by examiner

*Primary Examiner*—A. Michael Chambers
(74) *Attorney, Agent, or Firm*—Howison & Arnott, L.L.P.

(57) ABSTRACT

A portable gas supply apparatus comprises first and second storage tanks, a first pressure reducing device, a manifold and a first pneumatic connector fitting. The first storage tank includes an internal cavity for holding a supply of a pressurized fluid at a relatively high pressure, and is thermally uninsulated such that the pressurized fluid therewithin remains at ambient temperature. The first pressure reducing device has an inlet in fluid communication with the internal cavity of the first storage tank and an outlet. The first pressure reducing device reduces the pressure of fluid flowing therethrough from the relatively high pressure at the inlet to a first relatively lower pressure at the outlet. The manifold has a plurality of manifold connection points in fluid connection with one another. A first of the manifold connection points is in fluid communication with the outlet of the first pressure reducing device. The second storage tank has an internal cavity for holding pressurized fluid at the first relatively lower pressure, and the internal cavity is in fluid communication with a second of the manifold connection points. The first pneumatic connector fitting is in fluid communication with a third of the manifold connection points. When a pressurized fluid is stored in the first storage tank at the relatively high pressure, a pneumatic tool connected to the first pneumatic connector fitting is provided with pressurized gas at the first relatively lower pressure.

20 Claims, 4 Drawing Sheets

PORTABLE PRESSURIZED GAS SUPPLY APPARATUS FOR PNEUMATIC EQUIPMENT

CROSS-REFERENCE TO RELATED APPLICATIONS

This application is related to and claims the benefits of priority from U.S. Provisional Patent Application Ser. No. 60/419,010, entitled "PORTABLE PRESSURIZED GAS SUPPLY APPARATUS FOR PNEUMATIC EQUIPMENT", filed Oct. 16, 2002.

TECHNICAL FIELD OF THE INVENTION

The current invention relates generally to systems for powering pneumatically operated tools. More particularly, this invention relates to portable apparatus for supplying pressurized gas for the operation of pneumatic tools and other equipment which normally run on compressed air.

BACKGROUND OF THE INVENTION

Portable gas supply systems, also called portable pneumatic power sources, are used for powering pneumatic equipment, e.g., nailers, screwdrivers, hammer-drills, impact wrenches, etc., at construction sites and other locations where electricity is not readily available to power a conventional electric air compressor. Three types of conventional portable pneumatic power sources are known: gasoline or diesel engine-powered compressors; room-temperature storage systems having a single high-pressure tank holding compressed gas or fluid; and cryogenic-temperature storage systems having an insulated tank holding liquified cryogenic fluids. Each of these conventional types of power source has numerous disadvantages.

The disadvantages of conventional engine-powered compressors include: they are relatively expensive to purchase because of their mechanical complexity; they need frequent maintenance because of their large number of moving parts; their flammable fuel may constitute a fire hazard; their exhaust fumes are hot and may be toxic if operated in a confined space.

The disadvantages of conventional room-temperature storage systems include: the heavy storage tank typically used in such systems may be difficult to move around the site, especially onto elevated floors or scaffolding.

The disadvantages of conventional cryogenic-temperature storage systems include: the cryogenic fluid must be obtained from specialized suppliers, and may not be available in all areas; and the cryogenic fluid cannot be stored indefinitely when not being used, but instead will "boil off" over time (as waste).

A need therefore exists for an improved pneumatic power supply for pneumatic equipment that overcomes these shortcomings of the prior art and/or provides additional features not present in the prior art.

SUMMARY OF THE INVENTION

The present invention disclosed and claimed herein comprises, in one aspect thereof, a portable gas supply apparatus comprising first and second storage tanks, a first pressure reducing device, a manifold and a first pneumatic connector fitting. The first storage tank includes an internal cavity for holding a supply of a pressurized fluid at a relatively high pressure, and is thermally uninsulated such that the pressurized fluid therewithin remains at ambient temperature. The first pressure reducing device has an inlet in fluid communication with the internal cavity of the first storage tank and an outlet. The first pressure reducing device reduces the pressure of fluid flowing therethrough from the relatively high pressure at the inlet to a first relatively lower pressure at the outlet. The manifold has a plurality of manifold connection points in fluid connection with one another. A first of the manifold connection points is in fluid communication with the outlet of the first pressure reducing device. The second storage tank has an internal cavity for holding pressurized fluid at the first relatively lower pressure, and the internal cavity is in fluid communication with a second of the manifold connection points. The first pneumatic connector fitting is in fluid communication with a third of the manifold connection points. When a pressurized fluid is stored in the first storage tank at the relatively high pressure, a pneumatic tool connected to the first pneumatic connector fitting is provided with pressurized gas at the first relatively lower pressure.

The present invention disclosed and claimed herein comprises, in another aspect thereof, a portable gas supply apparatus comprising first and second storage tanks, a pickup tube, a first pressure reducing device, a manifold, a first pneumatic connector fitting, an extinguisher cut-off valve, a length of flexible tubing, an extinguisher activation valve and an expansion nozzle. The first storage tank includes an internal cavity for holding a supply of a pressurized fluid including liquid carbon dioxide at a relatively high pressure. The pickup tube extends into the internal cavity and has a free end disposed proximate to the bottom of the internal cavity such that any liquid present in the internal cavity can flow up the pickup tube. The first pressure reducing device has an inlet in fluid communication with the pickup tube and an outlet. The first pressure reducing device reduces the pressure of fluid flowing therethrough from the relatively high pressure at the inlet to a first relatively lower pressure at the outlet. The manifold has a plurality of manifold connection points in fluid connection with one another. A first of the manifold connection points is in fluid communication with the outlet of the first pressure reducing device. The second storage tank has an internal cavity for holding pressurized fluid at the first relatively lower pressure, and the internal cavity is in fluid communication with a second of the manifold connection points. The first pneumatic connector fitting is in fluid communication with a third of the manifold connection points. The extinguisher cut-off valve has an inlet and an outlet, the inlet being in fluid communication with the pickup tube. The extinguisher cut-off valve is selectively movable from a closed position, wherein fluid flow from the inlet to the outlet is blocked, to an open position, wherein fluid can flow from the inlet to the outlet. The flexible tubing has a first end in fluid communication with the outlet of the extinguisher cut-off valve. The extinguisher activation valve has an inlet and an outlet, the inlet being in fluid communication with a second end of the flexible tubing. The extinguisher activation valve is manually operable to control the amount of fluid passing from the inlet to the outlet. The expansion nozzle is in fluid communication with the outlet of the extinguisher activation valve. When a pressurized fluid containing liquid carbon dioxide is stored in the first storage tank at the relatively high pressure, a pneumatic tool connected to the first pneumatic connector fitting is provided with pressurized gas at the first relatively lower pressure, and when the extinguisher cut-off valve is in the open position and the extinguisher activation valve is opened, carbon dioxide at the relatively high pressure from the first storage tank flows through the flexible tubing and is discharged from the expansion nozzle so as to be directable for fire-extinguishing purposes.

DETAILED DESCRIPTION OF THE INVENTION

The subject matter of the present invention will be particularly pointed out in the appended claims. For a better understanding of the present invention, its various objects and advantages, reference is made to the following detailed description taken in conjunction with the accompanying drawings.

Figure 1:
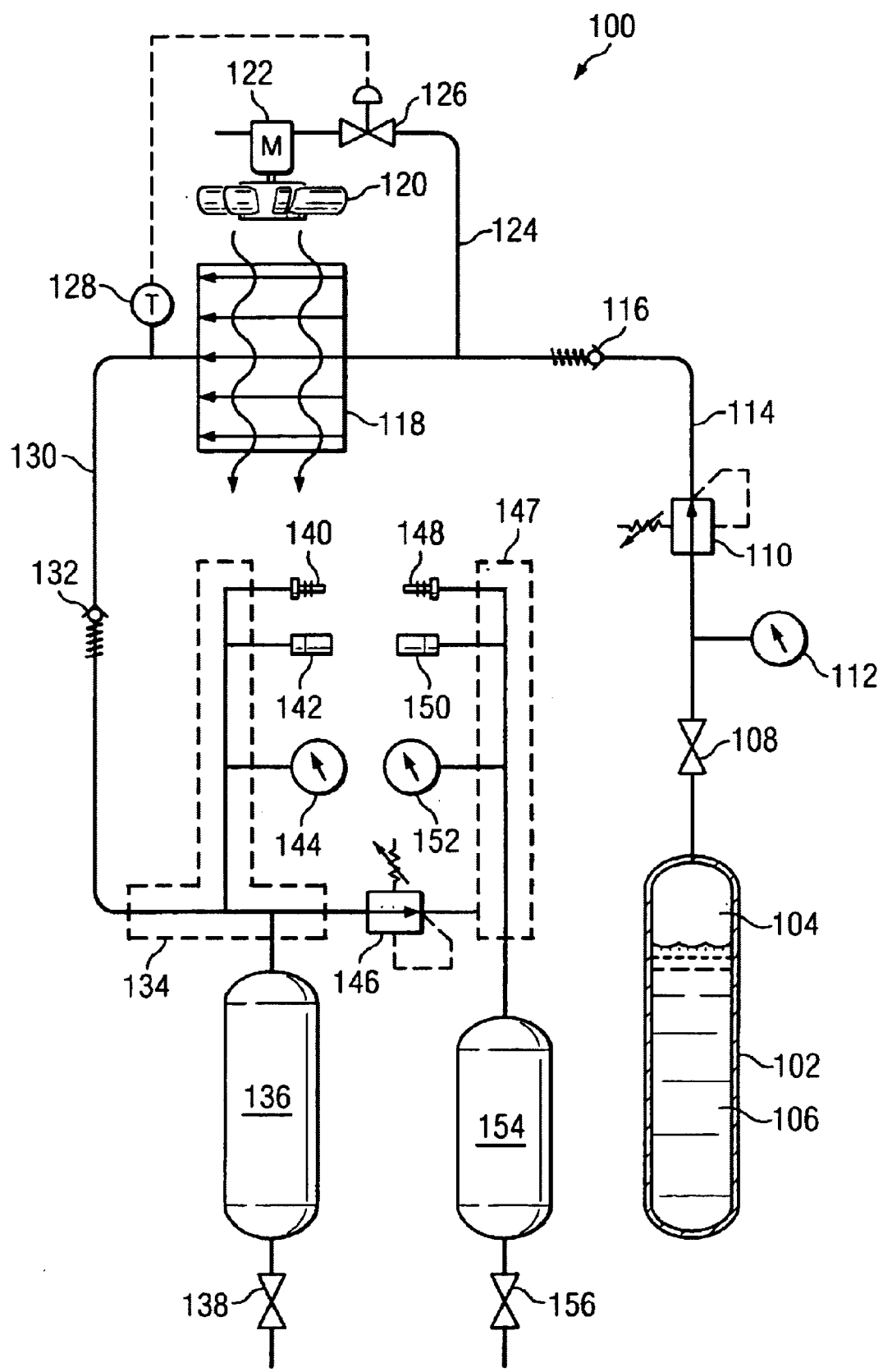
FIG. 1 is a schematic drawing of a first embodiment of the invention.

Referring now to FIG. 1, there is illustrated a schematic drawing of a first embodiment of the invention. The portable pressurized gas supply apparatus 100 includes a high pressured tank 102 for storing the source fluid at ambient temperature. Typically, the high pressure tank 102 is not thermally insulated. In the embodiment shown, the source fluid is carbon dioxide (CO2) which liquifies under moderate pressures resulting in a gas phase 104 over a liquid phase 106 inside the high pressure tank. While the embodiment illustrated in FIG. 1 uses CO2 as a source fluid, it will be appreciated that other embodiments may utilize other non-flammable gases which liquify under moderate pressures at room temperature, mixtures of liquified and non-liquified gases (e.g., CO2 and nitrogen mixture) or compressed non-liquified gases such as air or nitrogen. The high pressure tank 102 is of conventional design and may be formed of steel, aluminum and/or composites. For example, a conventional steel welding tank can be used for high pressure (i.e., 700 psi to 2500 psi) applications, while a tank of the type used for dispensing CO2 for fountain drinks may be used for moderate pressure (i.e., 400 psi to 700 psi) applications. The high pressure tank 102 is connected via a shut-off valve 108 to a conventional pressure regulator 110. The pressure regulator 100 throttles the CO2 from the storage tank 102, reducing the pressure from the high pressure in the storage tank to a first relatively lower pressure specified by the user. Preferably, the pressure regulator 110 is of the user-adjustable type which allows the user to select the outlet pressure the of regulator using a knob or dial. A pressure gauge 112 may be provided upstream of the regulator 110 in order to provide an indication of the pressure in the high pressure tank 102.

Expansion of the CO2 as it passes through the regulator 110 causes its temperature to fall as it enters the outlet line 114. This cooling may cause the unwanted condensation of liquids in the line. To prevent the back flow of any liquids that may be present in the outlet line 114, a one way valve 116 may be included.

The outlet line 114 flows to a heat exchanger 118 where the CO2 absorbs heat from the ambient air surrounding the heat exchanger to prevent freezing and to maximize its volumetric expansion. Preferably, the heat exchanger 118 is of a conventional finned tube type, however, it will be appreciated that any known type of heat exchange can be used including coils of plain copper or aluminum tubing spliced into the CO2 line. To increase the effectiveness of the heat exchanger 118, a fan or blower 120 may be provided to increase air flow across the device. In the embodiment shown, the fan 120 is powered by a pneumatic motor 122 which receives CO2 from the apparatus via a side stream line 124. The speed of the fan 120 may be governed by a temperature-sensing control valve 126 which controls the flow of gas to the motor 122 based on the output of a temperature sensor 128 positioned downstream of the heat exchanger 118.

CO2 leaving the heat exchanger 118 flows through a downstream line 130 to a manifold 134 having a number of connection points in fluid communication with one another. A first of these manifold connection points is connected to a first low pressure tank or accumulator 136. Optionally, another a one way valve 132 may be placed on the downstream line 130 between the heat exchanger 118 and the manifold 134 in order to prevent the back flow of any remaining liquified CO2, water or other liquids in the system. The first low pressure accumulator 136 consists of a conventional pressure tank formed of steel, aluminum or other materials having a pressure rating compatible with the first relatively lower pressure at the outlet of the primary regulator 110. A drain cock 138 is provided at the bottom of the low pressure tank 136 in order to allow the user to drain any water or other liquids which may accumulate in the tank. The relatively high volume of the first accumulator tank 136 serves to prevent excessive pressure fluctuations in the manifold 134 as connected pneumatic tools start and stop. To allow the connection of pneumatic tools to the system, at least one (and preferably more) pneumatic connector fittings are connected to the manifold 134. In the embodiment shown, the pneumatic connector fittings including standard male and female quick-connect couplings 140 and 142, respectively. Optionally, a pressure gauge 144 may be provided to indicate the pressure on the manifold 134.

It will be appreciated that the pressure available to pneumatic connector fittings 140 and 142 from manifold 134 will be substantially the same as the pressure in accumulator tank 136. The pressure in the tank 136 will typically be selected to provide proper operating pressure for pneumatic tools such as nailers, screw drivers, etc. A typical pressure range for the first accumulator tank 136 is from about 60 psi to 150 psi. However, in certain applications, it may be desirable for the gas supply apparatus 100 to supply gas at two distinct pressures. For example, it may be desirable for one apparatus 100 to provide a first source of gas at about 100 psi for use of pneumatic nail guns, and a second source of gas at about 10 psi for use with low pressure, high volume paint spraying equipment. In such applications, a secondary regulator 146 may be connected to the manifold 134.

When provided, the secondary regulator 146 throttles the CO2 at the first relatively lower pressure (i.e., the pressure at the output of the primary regulator 110 and the pressure in the first accumulator tank 136) to a second relatively lower pressure at the output to the secondary regulator. It will be understood that the second relatively lower pressure is lower than the first relatively lower pressure. Preferably, the secondary regulator 146 is of the user adjustable type which allows the user to adjust the output pressure by turning a knob or other means. The output of the secondary regulator 146 goes to a secondary manifold 147 which is connected to at least one and preferably more pneumatic connections. In the embodiment shown, the secondary manifold 147 includes male and female quick connect pneumatic couplings 148 and 150, respectively, and a pressure gauge 152 for indicating the pressure available on the secondary manifold.

If high volumes of gas at the second relatively lower pressure are desired, a second accumulator tank 154 may be connected to the secondary manifold 147. The second accumulator 154 will minimize pressure fluctuations in the manifold due to changes in the volume of gas flow. A drain cock 156 should be provided on the second accumulator tank 154 to drain any accumulated liquids.

Figure 2:
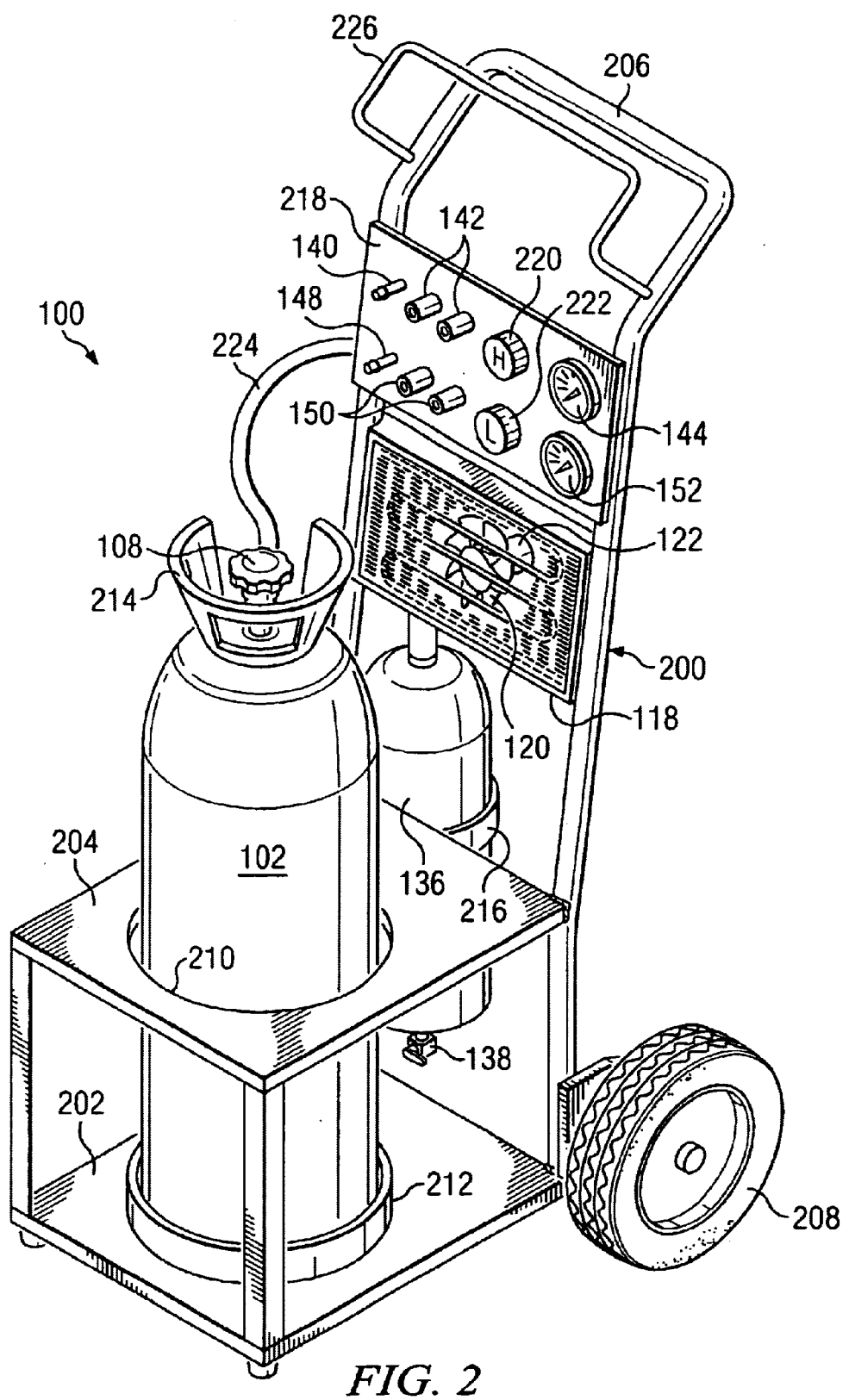
FIG. 2 is a perspective view of the invention of FIG. 1.

Referring now to FIG. 2, there is illustrated a perspective view of the apparatus 100. The apparatus of this embodiment further includes a transport frame 200 including a base plate 202, a support plate 204, a handle 206 and a pair of wheels 208. The wheels 208 and handle 206 allow the apparatus to be easily moved across the ground by a single person. The storage tank 102 passes through an opening 210 on the support plate 204 and rests within a collar 212 on the base plate 202. This arrangement securely supports the tank 102 during transport, yet allows easy removal of the tank if necessary for replacement or refilling. The high pressure tank 102 is typically provided with a safety collar 214 which protects the shut-off valve 108 from damage which could release the high pressure gas stored inside. It will be appreciated that welding grade tanks may have pressures as high as 2500 psi and lighter weight dispensing tanks may have pressures of up to 700 psi. The low pressure accumulator tank 136 is attached to the transport frame by a clamp 216 or other suitable means. If a second accumulator tank 154 is used, it can be mounted adjacent to the first accumulator tank 136.

The transport frame 200 of FIG. 2 includes a control panel 218 which is mounted on the handle 206. The manifolds, valves and other components previously described are mounted to the back of the control panel 218 with the quick couplings 140, 142, 150 and 152 protruding through the front face of the control panel to be readily accessible to the user. In addition, pressure gauges 144 and 152 may be located on the control panel 218 to provide an indication of the pressures available from the apparatus. In addition, adjustment knobs 220 and 222 may be provided to allow the user to select the output pressures of regulators 110 and 146, respectively. It will be appreciated that in order to position the high pressure regulator control 220 on the control panel 218, the high pressure regulator must typically be disposed away from the high pressure cylinder 102. In such cases a high pressure pipe or tube 224 must be provided between the shut-off valve 108 and the primary regulator 110. In other embodiments, the primary regulator 110 may be mounted on the high pressure cylinder 102 adjacent to the shut-off valve 108 such that a lower pressure supply line may be run from the high pressure tank to the control panel.

The heat exchanger 118 along with the fan 120 and fan motor 122 may be mounted on the transport frame handle 206 below the control panel 218. Piping between the control panel heat exchanger, first accumulator tank 136 and second accumulator tank 154 (if present) may all be routed along the back of the apparatus 100 anc concealed by a cover plate to minimize the chance of damage during use. A wire bail 226 may be provided on the handle 206 for the convenient storage of pneumatic hoses (not shown) to be used with the apparatus.

Actual tests conducted with a prototype of the apparatus using liquified CO2 at moderate pressures indicate that exceptional performance and endurance may be obtained. Selected test results are shown in Table 1.

TABLE 1

| Initial Pressure (psi) | Duration of Test (Hr.) | Tools Used | Duty Cycle | Final Pressure (psi) |
|---|---|---|---|---|
| 550 | 8 | Trim Nailer × 2 | Normal Use | 530 |
| 530 | 6 | Trim Nailer × 2 | Normal Use | 520 |
| 530 | 8 | Trim Nailer × 2 | Normal Use | 500 |
| 600 | 8 | Framing Gun × 1 ½" impact wrench × 1 ⅜" rachet × 1 | Normal Use | 570 |

RESULT OF PROTOTYPE TESTING USING LIQUIFIED CO2

Figure 3:
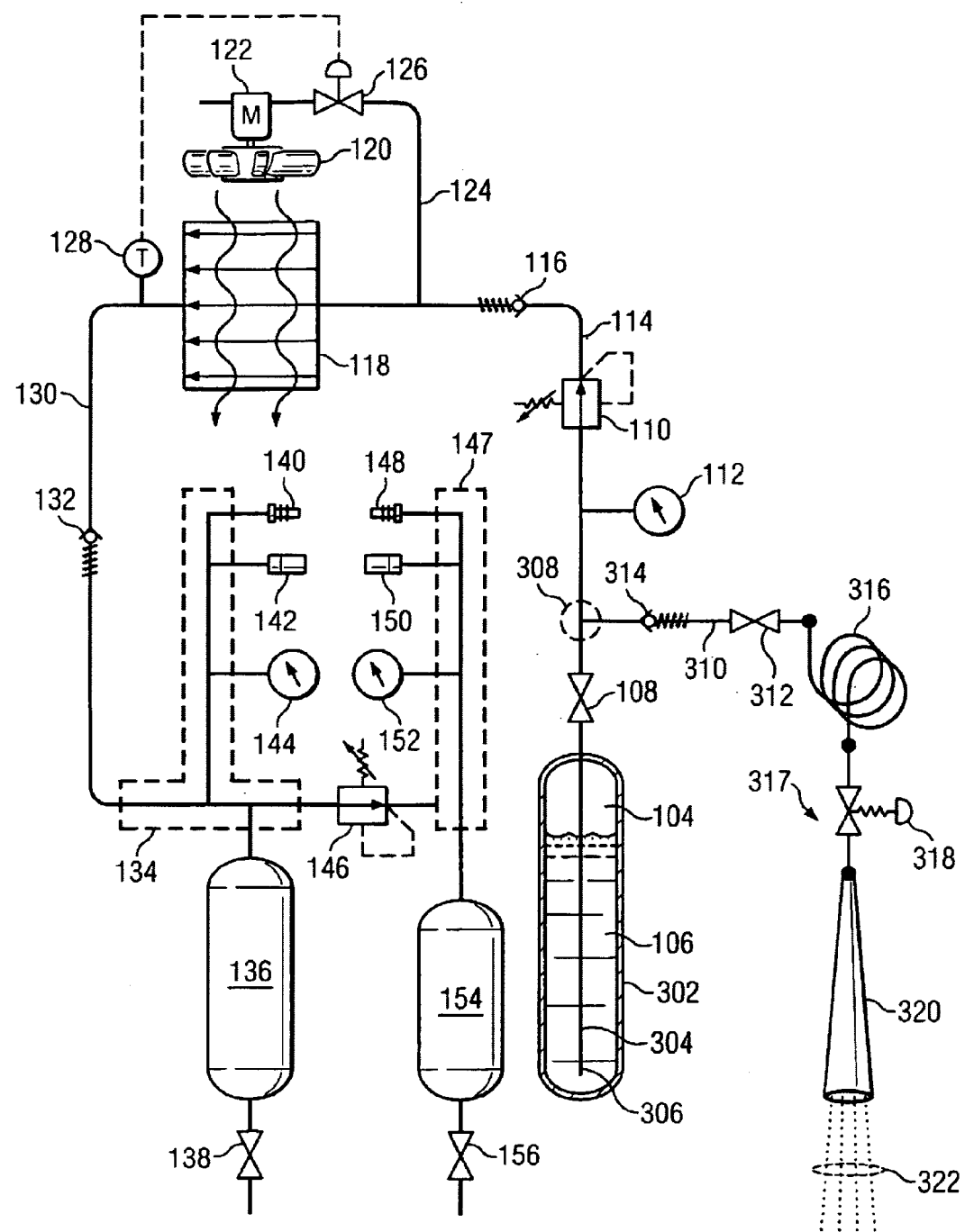
FIG. 3 is a schematic drawing of another embodiment of the invention including fire extinguisher features.

Referring now to FIG. 3, there is illustrated a schematic drawing of another embodiment of the invention which is specifically tailored for use with liquified CO2 as the supply gas. In this embodiment, the apparatus 300 functions as both a portable gas supply and as a high capacity fire extinguisher. Most of the components of the dual use apparatus 300 are identical to those used in the gas supply apparatus 100 previously described, and therefore are denoted using the same reference numerals. The storage tank 302 of the apparatus 300 includes a pickup tube 304 extending from the shut-off valve 108 into the interior of the tank. The lower end 306 of the pick up tube 304 is positioned near the bottom of tank 302 such that it is always within the liquid phase 106 of the CO2 within the tank. The pick up tube 304 insures that liquid CO2 is metered into the apparatus when shut-off valve 108 is open.

A tee connection 308 allows a high pressure side stream line 310 to be connected to the main high pressure line between the shut-off valve 108 and the primary regulator 110. A shut-off valve 312 is provided on the high pressure line 310 to control the flow of CO2 to the fire extinguisher unit. A one way valve 314 may be provided on the high pressure line 310 upstream of the shut-off valve 312 to prevent any back flow into the main system. A flexible hose 316 is connected at one end to the shut-off valve 312 and is connected at the other end to a nozzle assembly 317 including an extinguisher activating valve 318 and an extinguisher expansion nozzle 320. The flexible hose 318 may be a high pressure hose capable of withstanding the full pressure in the high pressure tank 302, or alternatively, a relief valve may be incorporated into the hose or the nozzle assembly 317 to prevent bursting of the hose when the fire extinguisher feature is activated. The user activates the fire extinguisher feature by first opening shut-off valve 312 (this assumes that the apparatus 300 is already in use with the main shut-off valve 108 in the open position). After placing the shut-off valve 312 in the open position, the user can then extend the flexible hose 316 in order to approach the fire with the nozzle assembly 317 without moving the remaining portions of the apparatus. Obviously, not having to move the entire apparatus near the fire to use the fire extinguishing feature is a great advantage in emergency situations. Once the user has approached the fire with the nozzle assembly 317, the valve 318 is activated to direct a stream 322 of CO2 onto the fire. An expansion nozzle or throttle (not shown) of the type know in the art may be included in the nozzle assembly 317 to produce the appropriate type of CO2 stream, e.g., CO2 "snow," for fire extinguishing purposes.

Figure 4:
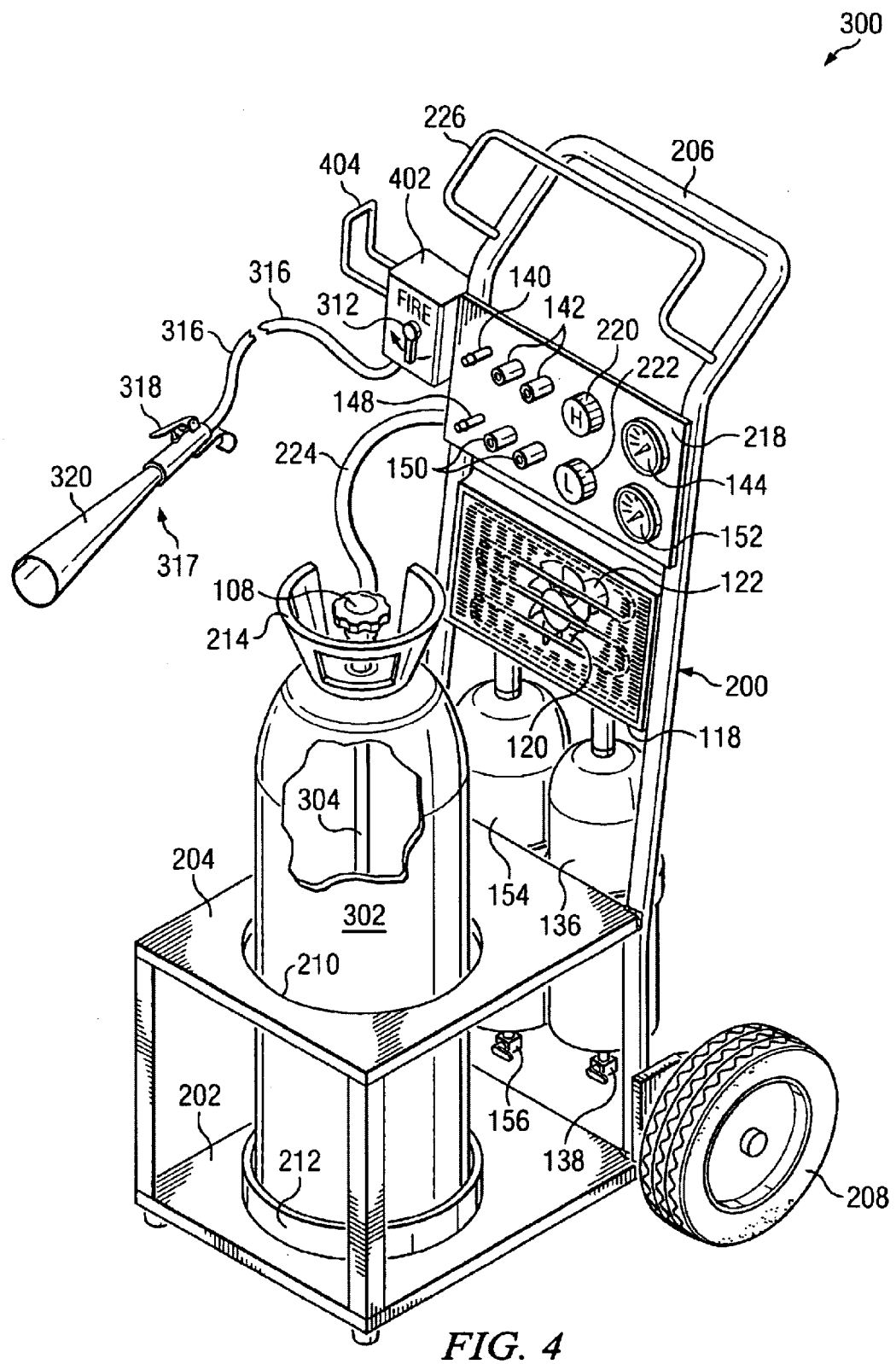
FIG. 4 is a perspective view of the invention of FIG. 3.

Referring now to FIG. 4, there is illustrated a perspective view of the dual use apparatus 300 which includes the fire extinguisher features. It will be appreciated that the high pressure tank 302 having the internal pick up tube 304 mounts to transport frame 200 in the same manner as the high pressure tank 102 of the first embodiment. A fire control panel 402 is mounted on the handle 206 on one side of the main control panel 218. The actuating handle for the shut-off valve 312 extends through the fire control panel 402, which will typically be marked with prominent instructions for operation of the fire extinguisher feature. A hose bail 404 may be provided on the side of the fire control panel 402 for storing the flexible hose 316 and nozzle assembly 317. In all other respects, the dual purpose apparatus 300 shown in FIG. 4 is identical to the gas supply apparatus 100 previously described.

Although several embodiments have been described in detail, it should be understood that various changes, substitutions and alterations can be made therein without departing from the spirit and scope of the invention as defined by the appended claims.

What is claimed is:

1. A portable gas supply apparatus, comprising:
   a first storage tank including an internal cavity for holding a supply of a pressurized fluid at a relatively high pressure, the first storage tank being thermally uninsulated such that the pressurized fluid therewithin remains at ambient temperature;
   a first pressure reducing device having an inlet in fluid communication with the internal cavity of the first storage tank and an outlet, the first pressure reducing device reducing the pressure of fluid flowing therethrough from the relatively high pressure at the inlet to a first relatively lower pressure at the outlet;
   a manifold having a plurality of manifold connection points in fluid connection with one another, a first of the manifold connection points being in fluid communication with the outlet of the first pressure reducing device;
   a second storage tank including an internal cavity for holding pressurized fluid at the first relatively lower pressure, the internal cavity being in fluid communication with a second of the manifold connection points; and
   a first pneumatic connector fitting in fluid communication with a third of the manifold connection points;
   whereby, when a pressurized fluid is stored in the first storage tank at the relatively high pressure, a pneumatic tool connected to the first pneumatic connector fitting is provided with pressurized gas at the first relatively lower pressure.

2. A portable gas supply apparatus in accordance with claim 1, further comprising a frame connected to the first storage tank and the second storage tank, the frame including a handle and at least two wheels rotatably mounted on the frame so as to support the frame above the ground, whereby the apparatus may be rolled along the ground on the wheels by a single person holding the handle.

3. A portable gas supply apparatus in accordance with claim 2, further comprising a heat exchanger having an inlet in fluid communication with the outlet of the first pressure reducing device and an outlet in fluid communication with the manifold, the heat exchanger allowing heat transfer from the ambient air to the pressurized fluid flowing between the outlet of the first pressure reducing device and the manifold.

4. A portable gas supply apparatus in accordance with claim 3, further comprising:
   a temperature sensor for sensing the temperature of the pressurized fluid at the outlet of the heat exchanger and producing an output indicative of the temperature;
   a blower for forcing ambient air through the heat exchanger; and
   a blower motor driving the blower in response to the output from the temperature sensor.

5. A portable gas supply apparatus in accordance with claim 4, wherein the blower motor is a pneumatic motor powered by gas from the apparatus.

6. A portable gas supply apparatus in accordance with claim 3, further comprising a one-way valve having an inlet in fluid communication with the outlet of the first pressure reducing device and an outlet in fluid communication with the manifold, the one-way valve allowing fluids to flow therethrough only in the direction from the first pressure-reducing device toward the manifold.

7. A portable gas supply apparatus in accordance with claim 2, wherein the pressurized fluid in the first storage tank is carbon dioxide.

8. A portable gas supply apparatus in accordance with claim 7, wherein the carbon dioxide in the first storage tank includes carbon dioxide in a liquid phase.

9. A portable gas supply apparatus in accordance with claim 2, wherein the pressurized fluid in the first storage tank is a mixture of nitrogen and liquid carbon dioxide.

10. A portable gas supply apparatus in accordance with claim 2, wherein the relatively high pressure ranges from about 2500 psi to about 600 psi, and the first relatively low pressure ranges from about 150 psi to about 60 psi.

11. A portable gas supply apparatus in accordance with claim 2, further comprising:
    a second pressure reducing device having an inlet in fluid communication with the manifold and an outlet, the second pressure reducing device reducing the pressure of fluid flowing therethrough from the first relatively lower pressure at the inlet to a second relatively lower pressure at the outlet, the second relatively lower pressure being lower than the first relatively lower pressure;
    a secondary manifold having a plurality of secondary manifold connection points in fluid connection with one another, a first of the secondary manifold connection points being in fluid communication with the outlet of the second pressure reducing device; and
    a second pneumatic connector fitting in fluid communication with a second of the secondary manifold connection points;
    whereby, when a pressurized fluid is stored in the first storage tank at the relatively high pressure, a pneumatic tool connected to the second pneumatic connector fitting is provided with pressurized gas at the second relatively lower pressure.

12. A portable gas supply apparatus in accordance with claim 11, further comprising a third storage tank including an internal cavity for holding pressurized fluid at the second relatively lower pressure, the internal cavity being in fluid communication with a third of the secondary manifold connection points.

13. A portable gas supply apparatus in accordance with claim 11, wherein the relatively high pressure ranges from about 2500 psi to about 600 psi, the first relatively low pressure ranges from about 150 psi to about 60 psi, and the second relatively low pressure ranges from about 25 psi to about 5 psi.

14. A portable gas supply apparatus, comprising:
    a first storage tank including an internal cavity for holding a supply of a pressurized fluid including liquid carbon dioxide at a relatively high pressure;

a pickup tube extending into the internal cavity and having a free end disposed proximate to the bottom of the internal cavity such that any liquid present in the internal cavity can flow up the pickup tube;

a first pressure reducing device having an inlet in fluid communication with the pickup tube and an outlet, the first pressure reducing device reducing the pressure of fluid flowing therethrough from the relatively high pressure at the inlet to a first relatively lower pressure at the outlet;

a manifold having a plurality of manifold connection points in fluid connection with one another, a first of the manifold connection points being in fluid communication with the outlet of the first pressure reducing device;

a second storage tank including an internal cavity for holding pressurized fluid at the first relatively lower pressure, the internal cavity being in fluid communication with a second of the manifold connection points;

a first pneumatic connector fitting in fluid communication with a third of the manifold connection points;

an extinguisher cut-off valve having an inlet and an outlet, the inlet being in fluid communication with the pickup tube, the extinguisher cut-off valve being selectively movable from a closed position, wherein fluid flow from the inlet to the outlet is blocked, to an open position, wherein fluid can flow from the inlet to the outlet;

a length of flexible tubing having a first end in fluid communication with the outlet of the extinguisher cut-off valve;

an extinguisher activation valve having an inlet and an outlet, the inlet being in fluid communication with a second end of the flexible tubing, the extinguisher activation valve being manually operable to control the amount of fluid passing from the inlet to the outlet; and an expansion nozzle in fluid communication with the outlet of the extinguisher activation valve;

whereby, when a pressurized fluid including liquid carbon dioxide is stored in the first storage tank at the relatively high pressure, a pneumatic tool connected to the first pneumatic connector fitting is provided with pressurized gas at the first relatively lower pressure, and when the extinguisher cut-off valve is in the open position and the extinguisher activation valve is opened, carbon dioxide at the relatively high pressure from the first storage tank flows through the flexible tubing and is discharged from the expansion nozzle so as to be directable for fire-extinguishing purposes.

15. A portable gas supply apparatus in accordance with claim 14, further comprising a frame connected to the first storage tank and the second storage tank, the frame including a handle and at least two wheels rotatably mounted on the frame so as to support the frame above the ground, whereby the apparatus may be rolled along the ground on the wheels by a single person holding the handle.

16. A portable gas supply apparatus in accordance with claim 15, further comprising a heat exchanger having an inlet in fluid communication with the outlet of the first pressure reducing device and an outlet in fluid communication with the manifold, the heat exchanger allowing heat transfer from the ambient air to the pressurized fluid flowing between the outlet of the first pressure reducing device and the manifold.

17. A portable gas supply apparatus in accordance with claim 16, further comprising:

a temperature sensor for sensing the temperature of the pressurized fluid at the outlet of the heat exchanger and producing an output indicative of the temperature;

a blower for forcing ambient air through the heat exchanger; and a blower motor driving the blower in response to the output from the temperature sensor.

18. A portable gas supply apparatus in accordance with claim 17, wherein the blower motor is a pneumatic motor powered by gas from the apparatus.

19. A portable gas supply apparatus in accordance with claim 15, further comprising:

a second pressure reducing device having an inlet in fluid communication with the manifold and an outlet, the second pressure reducing device reducing the pressure of fluid flowing therethrough from the first relatively lower pressure at the inlet to a second relatively lower pressure at the outlet, the second relatively lower pressure being lower than the first relatively lower pressure;

a secondary manifold having a plurality of secondary manifold connection points in fluid connection with one another, a first of the secondary manifold connection points being in fluid communication with the outlet of the second pressure reducing device; and a second pneumatic connector fitting in fluid communication with a second of the secondary manifold connection points;

whereby, when a pressurized fluid is stored in the first storage tank at the relatively high pressure, a pneumatic tool connected to the second pneumatic connector fitting is provided with pressurized gas at the second relatively lower pressure.

20. A portable gas supply apparatus in accordance with claim 19, further comprising a third storage tank including an internal cavity for holding pressurized fluid at the second relatively lower pressure, the internal cavity being in fluid communication with a third of the secondary manifold connection points.

* * * * *